March 7, 1961 H. J. MURPHY 2,973,565
FASTENER
Filed Jan. 13, 1958

INVENTOR:
HOWARD J. MURPHY,
BY *Emery, Booth, Townsend*
*Miller & Weidner* ATTORNEYS.

United States Patent Office 2,973,565
Patented Mar. 7, 1961

2,973,565

FASTENER

Howard J. Murphy, North Wilmington, Mass., assignor to United-Carr Fastener Corporation, Cambridge, Mass., a corporation of Delaware Filed Jan. 13, 1958, Ser. No. 708,677

2 Claims. (Cl. 24—73)

This invention relates to a fastener member for use in securing together cooperating parts, at least one of said parts having a through hole therein with which a portion of the member cooperates for securing anchorage in the hole. When so anchored the member may, as in the specific example herein illustrated, serve as an intermediate element for mounting another part on the apertured structure to which a member is anchored. As I anticipated that a considerable field of use of the invention will be for mounting a metal molding on the face of a sheet metal structure such as a portion of an automobile body, a form of fastener embodying the invention specifically designed for such use is herein illustrated although obviously the invention is not limited to such use and application.

The invention will be well understood by reference to the following description taken in connection with the drawings, wherein.

Figure 2:
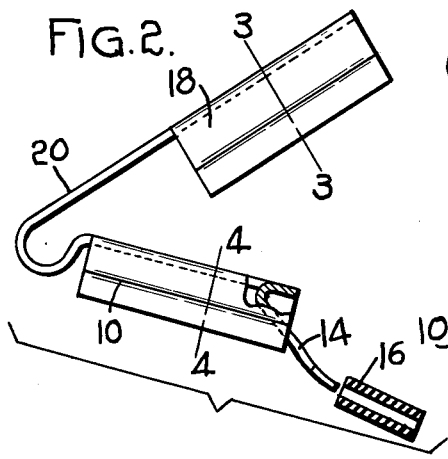
Fig. 2 is a side view with parts broken away, showing the fastener ready for application but with a portion separated therefrom.
Figure 3:
Figure 4:
Figure 5:
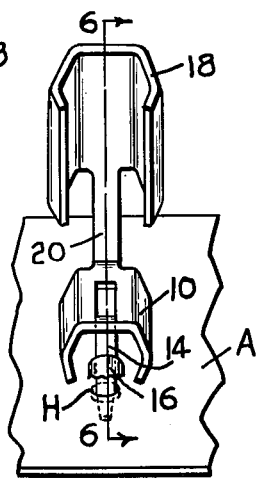
Figure 6:
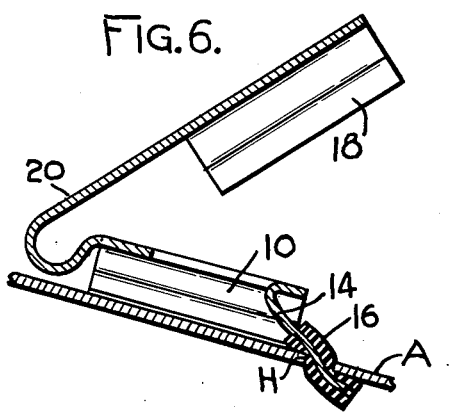
Figure 7:
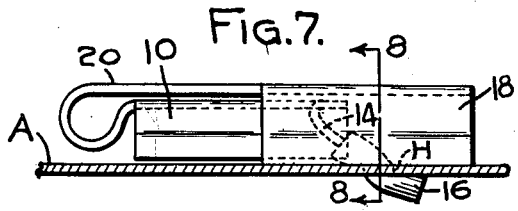

Figs. 3 and 4 are sections on the lines 3—3 and 4—4 of Fig. 2 respectively;

Fig. 5 is a perspective view showing the fastener applied to an apertured structure ready to be bent to make the engagement permanent, and is a view of Fig. 6 as seen from the right;

Fig. 6 is a section on the line 6—6 of Fig. 5;

Fig. 7 is a side view showing the fastener in its secured position; and

Figure 8:
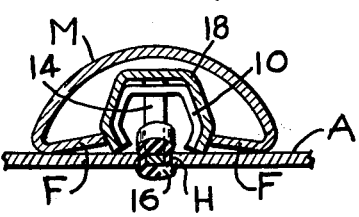

Fig. 8 is a section in the plane 8—8 of Fig. 7 and showing a molding secured by means of the fastener.

In the drawings there is shown in Figs. 5 through 8 a small portion A of a sheet metal wall of an automobile body to which it is desired to attach a sheet metal molding M as shown in Fig. 8 by means of an intermediate fastener as, for instance, by snapping flanges F of the molding over a suitably contoured outer surface of the fastener. Such general combination of parts is not new. Through holes H are made in a suitable series in the apertured part A and it is desirable that the fasteners be secured to the latter one after another in a single operation after which the molding may be attached. The embodiment of the fastener shown has particular advantages as it may be applied with one hand and by essentially a single movement. There is no rubbing or sliding over the external surface of the body plate A which might mar the finish and start rust.

An important feature of the fastener in the form shown, when applied to this field of use, is that with the application of suitable packing material the hole may be closed watertight incident to the insertion of the fastener, and thus water cannot find its way into the interior spaces of the automobile body.

In the following description I shall use the words "forward" and "rearward" from the point of view of one standing at the outside of the automobile body and applying the fasteners thereto, the forward face of the part A being the face nearer him and the rearward face that further away or at the back, and in general these words would correspond to "upper" and "lower" when referring to the annexed drawing. "Right" and "left" will be used with reference to the drawing. All these words are merely relative.

Figure 1:
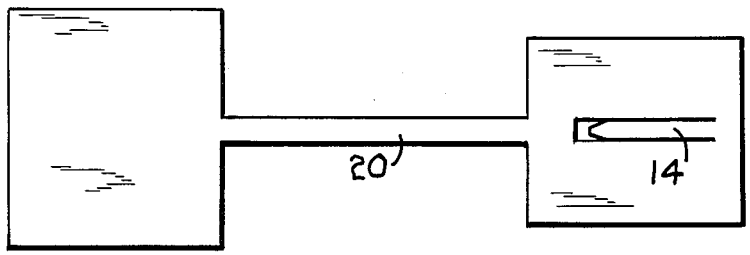
Fig. 1 is a plan view showing the parts of the fastener developed in a plane.

The fastener shown may be made of a single piece of sheet metal shown developed in a plane in Fig. 1 and comprises (see Figs. 2, 3 and 4) a primary part 10 in the form of a channel having a web and two flanges which are outwardly bowed to provide overhanging shoulders near their ends. It is believed that the application of a numeral to these shoulders would be merely confusing as the structure is quite apparent from Fig. 4 and Fig. 8. The channel is of substantial length. The edges of the primary part flanges define an extended surface adapted to rest flat on the forward surface of plate A, the primary part then overlying a substantial area of that plate.

From one end of the channel projects outwardly and rearwardly a narrow tongue 14, in the present instance cut from the web of the channel and bent over. This tongue is of small thickness relative to the dimensions of the hole H with which it is designed to cooperate, but of a width approximating one dimension of the cross section of the hole, the diameter in the case of a round hole as shown, and the tongue is of such length that when positioned through the hole in the manner shown in Fig. 6 its ends extend past the further or right-hand margin thereof to oppose the rearward surface of the plate at the right-hand side of the hole. When the base 10 rests flat against the forward face of the plate A the tongue will project beyond the edges of the hole on opposite sides of the plate at the extremities of the dimensions at right angles to the one above referred to, that is the diameter of the hole in the section shown in Fig. 6. A suitable investment 16 of packing material is applied to the tongue 14 herein taking the form of a short section of tubing of compressible rubber-like material shown separated from the tongue in Fig. 2, but which may be slid up on tongue to maintain itself thereon.

The part 10 with the projecting tongue 14 and its investment 16 may be advanced toward the hole with the tongue substantially perpendicular to the face of the plate A to enter therein. If the part 10 is then turned down flatwise against the plate, as seen in Fig. 6, the rearward end of the tongue would be brought opposite the rearward face of the plate at the right-hand side of the hole viewing Fig. 6 and the tongue will bridge across the upper left-hand and lower right-hand margins of the hole which will compress the investment 16 and expand it laterally as a consequence of the compression and form a watertight packing between the wall of the hole and the tongue. In this position the base 10 could not be removed by a mere movement perpendicular to the plate A. To maintain it in this position a secondary part bendably associated with the part 10 forms a part of the fastener and herein this element consists of a channel 18 (see Fig. 3) with bowed flanges being generally similar to the channel 10 but larger in cross section. The two channels 10 and 18 are herein bendably connected by an integral looped band 20 joining the webs of the channels. This band initially supports the secondary part 18 in a forward or elevated position relative to part 10, but it may be folded down forwardly and its left-hand end viewing Fig. 6 will come down over the right-hand end of the primary part 10 for a considerable distance and project beyond to the right. The internal dimension of the secondary part 18 corresponds substantially to the outer dimension of the part 10 so that when the former is pressed down the flanges of the channel 18 may flex and the part 18 will snap over the part 10 and be retained thereon, the edge portions of the flanges of 18 serving as ribs which underly the shoulders formed by the corresponding parts of the primary member 10 viewing Fig. 8. The two parts are thus latched together and are disposed in crossing relation to the hole H and are in effect a beam laid across the hole holding the element firmly anchored since the primary part 10 cannot tip up (clockwise viewing Fig. 7) to permit the tongue 14 to be withdrawn from the hole.

The fastener with the parts related as shown in Fig. 1 may be grasped with a single hand, pushed into the hole and by pressure of the edge of the hand, substantially as a continuation of the inserting motion, the part 18 can be folded down to the position of Fig. 7. A whole series of fastenings can thus be rapidly applied to a row of holes.

Referring to Fig. 8 the molding M of conventional form, having the rearward and inwardly turned flanges F, can be snapped on over the series of fasteners as the edges of the flanges F engage beneath the shoulders provided by the inbent extremities of the flanges of the secondary channel shaped member 18 as seen in Fig. 8.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Rerefence is to be had to the appended claims to indicate those principles of the invention exemplified by the particular embodiment described and which I desire to secure by Letters Patent.

I claim:

1. A unitary, self-sufficient fastener member for co-operating with a through hole in a structure, the member comprising a primary part having a surface to rest on the margin of the hole on one side thereof over an area of substantial length and breadth, a tongue extending outwardly and rearwardly from an end of said part to project through the hole and extend past the rearward margin thereof on the opposite side, at least a portion of said primary part adjacent the tongue having the cross-section of a channel the length of which extends in the same general direction as the tongue with outwardly bowed flanges defining overhanging shoulders and a secondary part having a similar but slightly larger cross-section, the flanges of the latter part being resiliently yieldable to permit them to snap over the primary part and engage beneath the shoulders thereof to extend past said portion and overlie the forward margin of the hole at the side opposite the primary part, the primary and secondary parts being integrally joined by a bendable strip.

2. A unitary, self-sufficient fastener member for co-operating with a through hole in a structure, the member comprising a primary part having a surface to rest on the margin of the hole on one side thereof over an area of substantial length and breadth, a tongue extending outwardly and rearwardly from an end of said part to project throught the hole and extend past the rearward margin thereof on the opposite side, at least a portion of said primary part adjacent the tongue having the cross-section of a channel the length of which extends in the same general direction as the tongue with outwardly bowed flanges defining overhanging shoulders and a secondary part having a similar but slightly larger cross-section, the flanges of the latter part being resiliently yieldable to permit them to snap over the primary part and engage beneath the shoulders thereof to extend past said portion and overlie the forward margin of the hole at the side opposite the primary part, the primary and secondary parts being integrally joined by a bendable strip and the tongue being an integral portion of the web of the channel of the primary part deflected from the plane of the latter.

References Cited in the file of this patent
UNITED STATES PATENTS

| 2,460,722 | Waara | Feb. 1, 1949 |
| 2,566,886 | Hartman | Sept. 4, 1951 |
| 2,786,249 | Poupitch | Mar. 26, 1957 |

FOREIGN PATENTS

| 1,107,797 | France | Aug. 10, 1955 |